(12) United States Patent
Valliani et al.

(10) Patent No.: US 6,234,389 B1
(45) Date of Patent: May 22, 2001

(54) PCMCIA-BASED POINT OF SALE TRANSACTION SYSTEM

(75) Inventors: Aziz Valliani, Fremont; Nazim Kareemi, Palo Alto; Eric Bunn, San Jose, all of CA (US)

(73) Assignee: @Pos.Com, Inc., San Jose, CA (US)

( * ) Notice: Subject to any disclaimer, the term of this patent is extended or adjusted under 35 U.S.C. 154(b) by 0 days.

(21) Appl. No.: 09/069,642

(22) Filed: Apr. 29, 1998

(51) Int. Cl.[7] .................................................. H04C 17/00
(52) U.S. Cl. ............................. 235/380; 705/64; 705/66; 235/379; 235/381
(58) Field of Search .................................. 705/64, 67, 69, 705/72, 73, 75, 76, 80, 17; 235/379, 380, 381, 382

(56) References Cited

U.S. PATENT DOCUMENTS

| | | | | |
|---|---|---|---|---|
| 3,863,050 | * | 1/1975 | Brugger et al. | 235/380 |
| 4,034,211 | * | 7/1977 | Horst et al. | 235/454 |
| 4,758,714 | * | 7/1988 | Carlson et al. | 235/380 |
| 4,775,784 | * | 10/1988 | Stark | 235/380 |
| 5,438,186 | * | 8/1995 | Nair et al. | 235/449 |
| 5,440,108 | * | 8/1995 | Tran et al. | 235/381 |
| 5,625,534 | * | 4/1997 | Okaya et al. | 361/686 |

* cited by examiner

Primary Examiner—Thomas R. Peeso
(74) Attorney, Agent, or Firm—Flehr Hohbach Test Albritton & Herbert LLP (57) ABSTRACT

The present invention provides a PCMCIA-compliant generic laptop computer or personal digital assistant ("PDA") device with an add-on module that together with the device forms a portable point of sale transaction terminal. The add-on module is a self-contained unit that includes a magnetic stripe reader or a smartcard reader with a PCMCIA-compatible interface. Optionally, the module also includes any or all of a pinpad unit, a printer unit, a fingerprint unit, a signature capture unit, and a virtual pinpad unit. The module housing includes a protruding snout-like member that includes a PCMCIA connector. This snout-like member on the module housing slides into the PCMCIA slot of the computer, PDA, or similar device to make mechanical and electrical connections. Software storable and executed by the computer or PDA device includes driver definitions and routines to permit the device to read and process information read by the module from the credit or smartcard. The device can communicate, wirelessly, with IR, or via telephone lines, with a remote host system to further process a transaction for which the card is being used. Additional software can also provide encryption, signature capture, and associated other transaction processing and security promoting functions.

20 Claims, 7 Drawing Sheets

PCMCIA-BASED POINT OF SALE TRANSACTION SYSTEM

RELATIONSHIP TO OTHER APPLICATIONS

Reference is made to co-pending U.S. application Ser. No. 08/853,955, filed May 9, 1997, entitled "Modular Signature and Data Capture System and Point of Transaction Payment and Reward System", assigned to the present assignee. Applicants incorporate said application by reference herein, which reference provides details as to signature capture and use of fingerprint capture to enhance transaction security in data-capture systems.

FIELD OF THE INVENTION

The invention relates generally to data-capture systems used to transact business, and more particularly to enabling PCMCIA-equipped generic portable computer systems including personal digital assistants ("PDA") to perform such point of sale transactions.

BACKGROUND OF THE INVENTION

Dedicated systems for facilitating point of sale transactions are known in the art, and indeed are familiar to most consumers in industrial countries. By "dedicated" it is meant that such systems are designed and intended to be used solely as point of sale transaction terminals, to be used to facilitate transactions.

Such systems are commonly used when a consumer (or user) pays for a purchase, or is to receive a credit-back, typically in conjunction with the consumer's credit card or debit card. At present, such cards bear a stripe or track of magnetic media that encodes the card owner's account information. There is a limit to the information storable on existing cards, and the industry is moving toward cards with three such stripes (or tracks). However, many prior art point of sale transaction systems cannot presently read more than two stripes of magnetically encoded information. So-called smartcards store card holder account number, account limits, or other data on an internal solid state memory that can be read or written to electronically by more modern point of sale transaction devices. Thus, the term "cards" as used hereinafter will be understood to refer to cards that store user account data, magnetically, in solid state memory, or otherwise.

With conventional credit cards, at the time or purchase or credit, the card is moved through a magnetic stripe reader, and the encoded information on the magnetic stripe is read. To promote security, the consumer typically must enter some sort of personal identification number ("PIN"), to help confirm that the consumer is indeed the authorized card owner. Entry is commonly made with a real or virtual (e.g., displayed) keypad, or more commonly pinpad, associated with the system in question. PIN information is typically not encoded on the magnetic stripe of a credit type card itself. Smartcards are temporarily plugged into a suitably equipped point of sale transaction terminal that is equipped to at least read data from such cards.

The point of sale transaction terminal is typically coupled to a host clearinghouse system that provides confirmatory information as to the account in question, security information including PIN confirmation, allowable transaction limits, and the like.

An especially useful device for facilitating point of sale transactions is the PenWare model 3000, available from PenWare of Sunnyvale, Calif. Among other modes of input, the model 3000 provides a pressure pad upon which the user writes a signature at time of transaction. A digitized version of the signature can be coupled to the host system, whereat a known signature of the true card owner can be stored. A comparison between the stored signature and the just-written signature can be made by the host system. The host system then notifies the point of sale system whether the two signatures appear to be written by the same person.

While the various systems described can, to a greater or lesser extent, facilitate point of sale transactions, all such systems are dedicated to facilitating such transactions and serve no other purpose. Frequently such equipment is bulky, not readily transportable, and expensive. While grocery stores, department stores and other large businesses can justify the cost, space, and maintenance required for dedicated point of sale transaction terminals, smaller businesses and individuals cannot.

On the other hand, a variety of relatively inexpensive generic computing devices exist, including laptop computers and PDAs. Many of these systems are equipped to accept PCMCIA-compatible accessories, typically modems, additional memory, CD-ROM interfaces, and the like. It would be useful to many vendors to be able to use such devices as point of sale transaction systems or terminals. An individual who transacts business on weekends at a flea market or a garage sale might do more business if credit card or smartcard payments could be reliably transacted. Many such individuals already own a laptop computer or PDA device, whereas few individuals would have access to a portable dedicated portable point of sale transaction system.

Thus, there is a need for a method and mechanism by which generic computing/PDA devices can be made to perform point of sale transaction functions. Such point of sale transaction systems should be portable, small in size, inexpensive, yet perform the necessary functions required to securely transact business.

The present invention provides such a method and system to implement point of sale transaction terminals.

SUMMARY OF THE INVENTION

The present invention provides a PCMCIA-compliant generic laptop computer or personal digital assistant ("PDA") device with an add-on module that provides point of sale functionality. Essentially the module converts the device to a portable inexpensive point of sale transaction terminal.

The add-on module preferably is a self-contained unit that includes a card reader with a PCMCIA-compatible interface. A protruding snout like member of the module housing slides into the PCMCIA slot of the computer, PDA, or similar device. Software is then loaded into and/or executed by the computer or PDA. When executed by the computer or PDA, this software allows the device to read and process information read by the module.

Typically payment for a transaction is made with a credit (or other) card that includes at least one magnetic stripe carrying information as to the card holder's credit account. Such cards are read with a module having a magnetic stripe reader unit. The information is read from the magnetic stripe by moving the credit card through the magnetic stripe reader. Other transactions may involve a smartcard, in which memory internal to the card retains data. Such cards are read (and/or written to) with a module having a smartcard reader/writer unit. Thus equipped with an appropriate card reader module, the computer or PDA device becomes a portable point of sale transaction terminal.

The resultant point of sale transaction terminal may communicate with a remote host system using telephone lines, wireless telephony, and/or infrared to process further a transaction for which the card is being used. Alternative embodiments provide the module with a secure pinpad unit, a virtual pinpad unit, a printer unit, a signature capture unit, and a fingerprint unit. Additional software can also provide data encryption and decoding, signature capture, and associated other transaction processing and security promoting functions.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1:
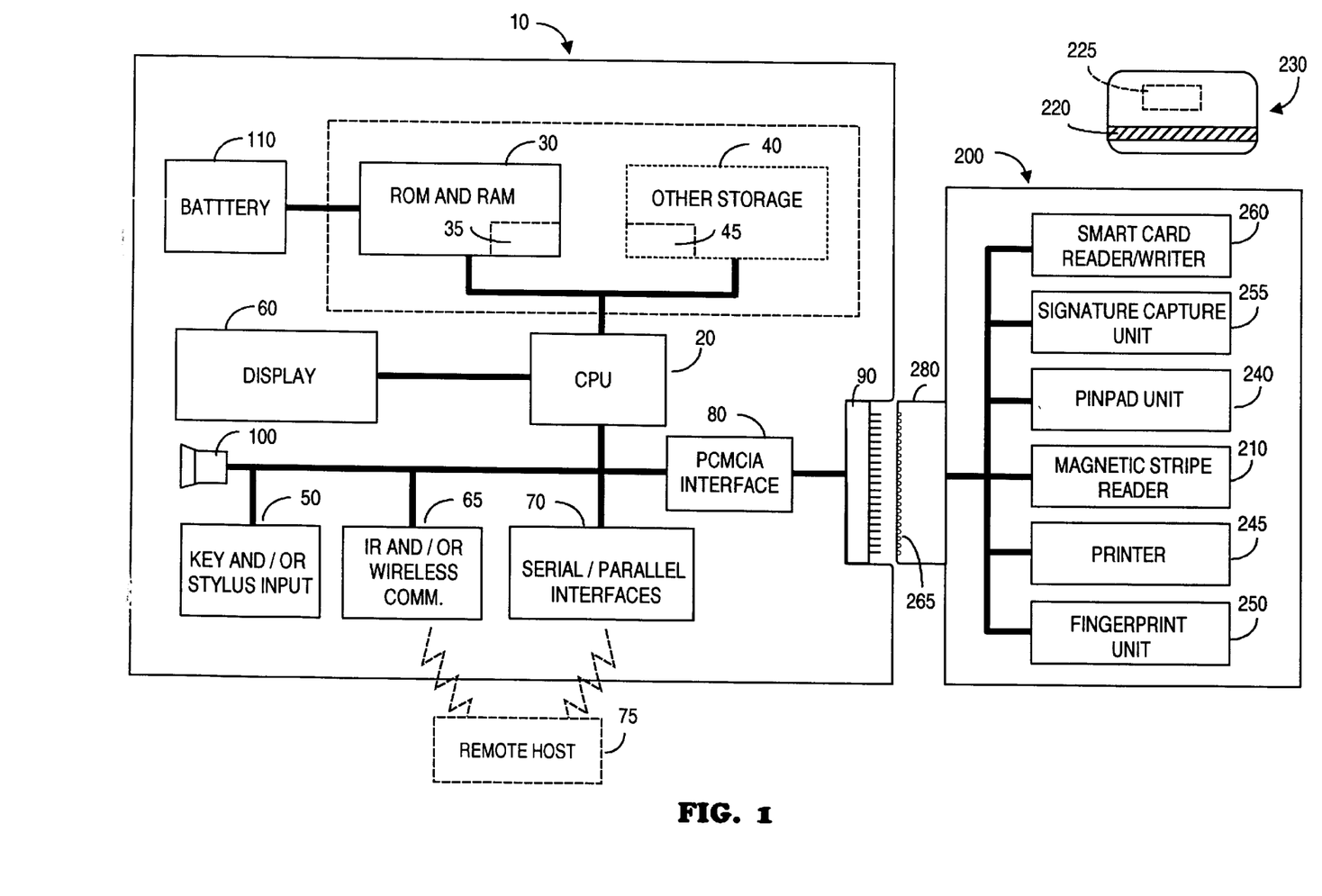
FIG. 1 is a block diagram of a laptop computer, PDA, or similar device combined with the present invention to implement a portable PCMCIA-based point of sale transaction terminal system.

FIG. 1 depicts a generic PCMCIA-compliant device 10 that, for purposes of use with the present invention, may be a portable computing device such as a laptop computer or a personal digital assistant ("PDA"). As such, the term "device" shall be understood to include these and other functionally equivalent PCMCIA-compliant computing systems. Especially portable devices 10 include the Sharp Zaurus PDA, as well as a variety of Windows CE-based PDAs produced by HP, Phillips, NEC, Compaq, among other manufacturers.

By "PCMCIA-compliant" it is meant that device 10 includes a PCMCIA interface, and provides at least one slot into which a PCMCIA-compliant card or other structure may be inserted to augment the native functionality of device 10. At present, the PCMCIA standard defines 68 pin connections arrayed in a package width of about 54 mm, and in a package height of 3.3 mm to 10.5 mm, depending upon the type of the PCMCIA accessory to be accommodated. The length of a PCMCIA-compliant accessory is about 86 mm.

Referring to FIG. 1, device 10 will include a central processor unit ("CPU") 20, memory including ROM and RAM, collectively 30, and optionally other storage 40, e.g., a hard disk in a laptop device, or flash memory in a PDA. Software 35 and/or 45 used to augment the present invention may be loaded or stored in such memory, for execution by CPU 20. Device 10 will include an input 50, which can include real or virtual (displayable touch) keys, a stylus, and an infrared port. Device 10 will also include an output such as display 60 (typically a liquid crystal display, or "LCD").

Device 10 typically includes modem capability, in addition to other modes of communication. For example, modern devices 10 frequently are provided with a wireless unit 65 that can include infrared ("IR") and/or radio frequency transmission/reception capability for wireless communications. Device 10 will commonly include serial and/or parallel interface ports 70. Using unit 65 and/or ports 70, device 10 can communicate with a remote host system 75, using an internal modem.

As noted, relevant to the present invention, device 10 will also include a PCMCIA interface port 80 that is physically coupled to a socket 90 mounted in a so-called PCMCIA-slot in the housing of unit 10. Accordingly, in FIG. 1 socket 90 is shown recessed, to reflect its physical location within a slot.

Essentially any PCMCIA-compliant card or other PCMCIA-compliant mechanism may be slid into this slot to make electrical connections with connector 90, and thus to interface with device 10. Finally, device 10 may be provided with an audio output 100, and is commonly powered by an internal battery 110. In summary, generic devices 10 are self-contained, portable, relatively inexpensive (typically under $1,000 for a PDA) and lightweight (less than one pound or 0.5 Kg for a PDA).

The righthand portion of FIG. 1 shows the present invention, module or module 200, as including a magnetic stripe reader 210 that reads information encoded and stored on at least one magnetic stripe (or track) 220 on a credit card (or other card) 230. Module 200 may provide a pinpad unit 240, a printer unit 245, a fingerprint reader unit 250, a signature capture unit and/or virtual pinpad unit 255, and/or a smartcard reader unit 260. Smartcard reader unit 260 is utilized if card 230 is a smartcard storing data in memory 225. Although FIG. 1 depicts module 200 as including all of these units, module 200 may include one of these units, or any desired combination of these units.

In any of its configurations, module 200 is PCMCIA-compliant. The housing for module 200 will provide a projecting snout-like member 280 that includes a connector edge 265 that slides into and matingly engages slot socket 90 in device 10. This projecting member will be sized as though it were itself a PCMCIA-card or accessory, and accordingly member 280 is shown in FIG. 1 projecting outwardly into the slot-like region of device 10. Member 280 will have a top-to-bottom thickness ranging from about 3.3 mm yo 10.5 mm, a width of about 54 mm, and will project outwardly a distance of at least about 86 mm from the housing of module 200.

When module 200 is mechanically and electrically coupled to unit 10 via connectors 90 and 265, operating power for module 200 may advantageously be taken from the unit 10 power source, e.g., battery 110 in FIG. 1. Further, all necessary PCMCIA electrical connections between device 10 and module 200 are also made at this time.

Figure 2:
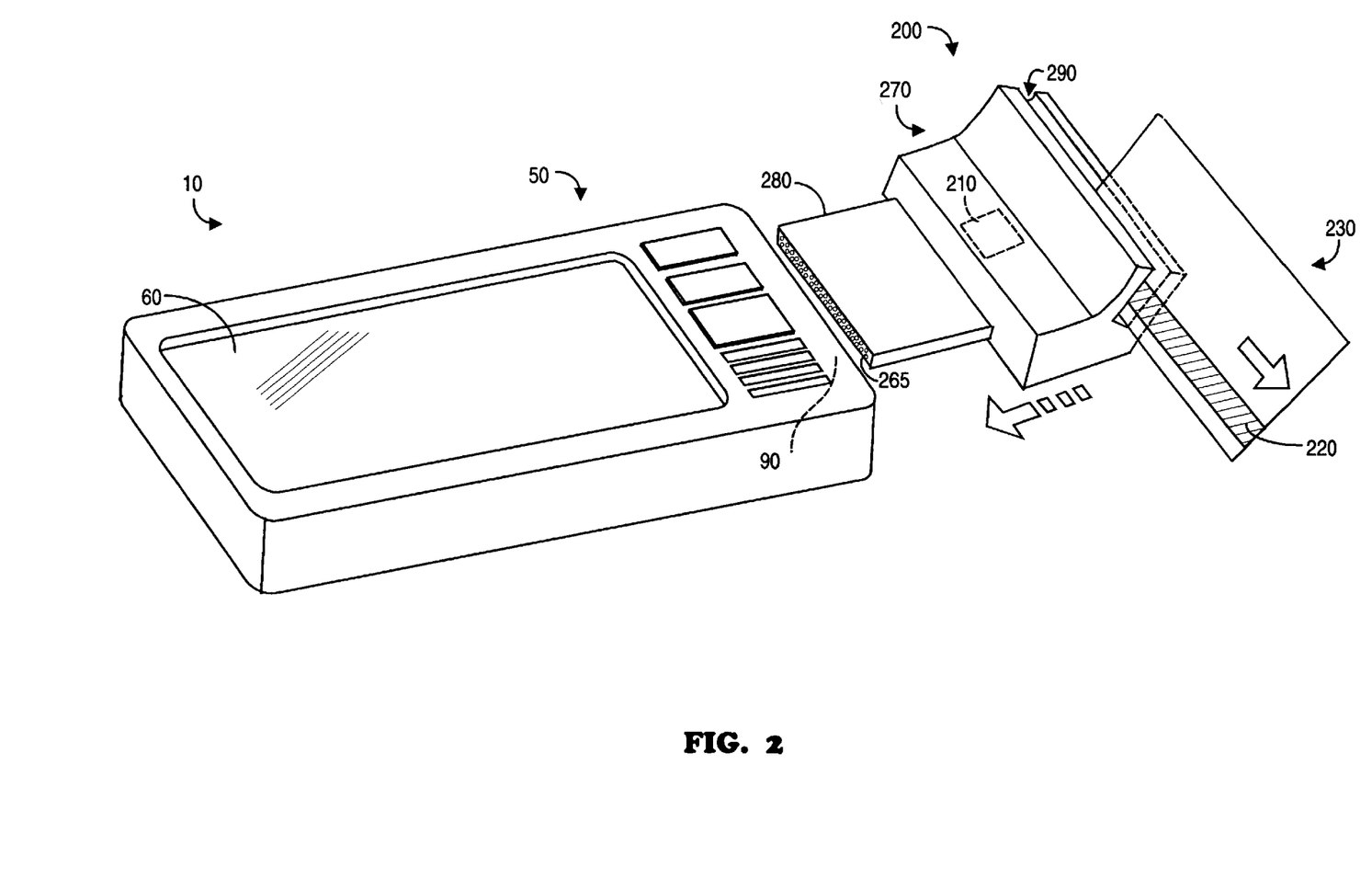
FIG. 2 is a perspective view of a first embodiment used with a PDA to implement a PCMCIA-based point of sale transaction terminal system according to the present invention.

FIG. 2 shows an embodiment of module 200 in which only the magnetic stripe reader 210 unit is provided. In FIG. 2, unit 210 is understood to include hardware and software necessary to implement the magnetic stripe reader unit. As noted, housing 270 of module 200 includes a projecting snout member 280 whose distal end includes connector 265. Snout member 280 and connector 265 are sized to slide into the PCMCIA slot in device 10, and to make electrical (and mechanical) connections with corresponding pins in socket 90. This sliding engagement is depicted in FIG. 2 by the articulated arrow pointing from module 200 toward device 10. Although device 10 is depicted as being a PDA, it may be a laptop computer or other functionally equivalent device.

Housing 20 defines a slot 290 through which card 230 may be moved or drawn (as indicated by the arrow shown on the card), for example with a user's hand. Electrical and mechanical components associated with magnetic card reader 210 are known and need not be described in detail. Briefly, as magnetic stripe 220 moves through slot 290, a read head associated with unit 210 senses magnetic charge embedded in stripe(s) 220. If desired, module 200 could also be used to write information magnetically to stripe(s) 220 on card 230. Associated read head electronics in unit 210 can process the magnetically sensed information to learn what was embedded in stripe 220. Typically information embedded in stripe 220 will include at least the card owner's credit account company and account number and owner identification.

For security reasons, a card owner's PIN is not stored magnetically on stripe 220 but may be stored electronically in memory 225. To promote security, electronics 210 provides any card 230-provided PIN information to device 10 in encrypted form only using internally stored encryption keys. For purposes of confirming security with the present invention, e.g., that the user presenting card 230 is indeed the owner of the card, it suffices for device 10 to confirm that PIN information provided from card 230, or from another source, agrees with PIN information input by the user during the present transaction.

As such, it is preferred that the actual PIN value never be known to device 10, as the comparison between card or externally-provided PIN and user-input PIN can be made without device 10 knowing the actual PIN value. Were it otherwise, an unscrupulous vendor might program device 10 with software that would capture and store in memory 30 or 40 a copy of the user's decoded PIN value, and account number. Armed with such information, the vendor could illegally seek to impersonate the user, for example, by ordering expensive merchandise by mail to be charged to the user's credit card account. To further promote security and guard against tampering, module 200 preferably includes an internal mechanical switch that senses when housing 270 is opened, e.g., to gain access to the circuitry and components within. When housing 270 is opened, circuitry 210 (which may include an internal security battery) will intentionally erase the contents of the internally stored encryption keys. As noted, these encryption keys are necessary to encrypt user-input PIN data and information entered from the pinpad. The encryption keys will typically have been loaded and stored into the pinpad by the pinpad manufacturer. As such, the resultant pinpad is made secure against tampering that might otherwise comprise transactions.

Consider now an exemplary application of the present invention. Assume that a library is conducting a used book sale, and some patrons wish to purchase books with credit cards. A library would not normally have a rather large and expensive point of transaction terminal. However, by virtue of the present invention, all that is required is for an off-the-shelf generic device 10, perhaps a PDA, to be equipped with module 200, as shown in FIG. 2. Software routine(s) 35 and/or 45, which can be provided with module 200 or may be available from other sources including the manufacturer of device 10, would be loaded into device 10.

These routines would include point of sale software and software driver(s) for the PCMCIA-implemented magnetic stripe reader 210 and can further include driver(s) for pinpad unit 240, printer unit 245, fingerprint unit 250, signature capture unit 255, and smartcard reader/writer unit 260. Such routines can also provide DES encryption, signature capture and signature compression, among other useful functions. These routines would be executed by central processor unit 20 within device 10.

Figure 3:
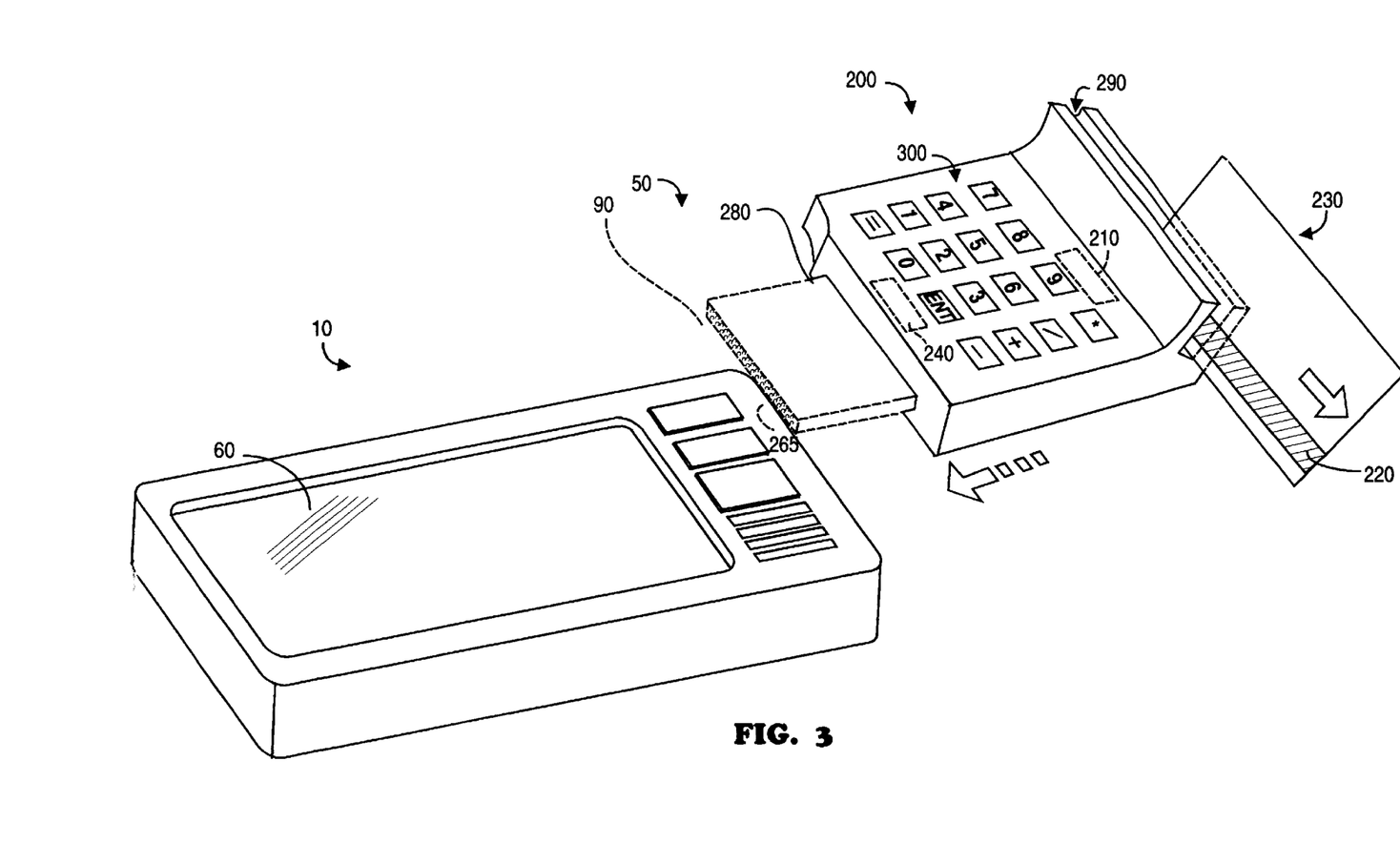
FIG. 3 is a perspective view of a second, secure pinpad unit equipped, embodiment used with a PDA to implement a PCMCIA-based point of sale transaction terminal system according to the present invention.

FIG. 3 depicts a second embodiment of the present invention, in which module 200 includes both magnetic stripe reader 210 and a pinpad unit 240. In FIG. 3, module 200 is shown slid into the PCMCIA slot in device 10 such that the module PCMCIA connector 265 engages the device 10 connector 90. In FIG. 3, element 240 is understood to represent hardware and software necessary to implement a pinpad unit, as used in the present invention.

The various pinpad keys 300 facilitate user input of data, including for example PIN identification data, to facilitate a secure transaction made with card 230. As noted, a card owner's PIN is not stored, encrypted or otherwise, in magnetic stripe(s) 220 but may be stored in memory 225. To confirm that card 230 has not been lost or stolen, at the time of a transaction the person using card 230 may be required to manually input the PIN data, e.g., using pinpad unit 240 keys 300. Software-memory within circuitry 240 encrypts user-input PIN data and, using device 10 as an interface terminal, causes such encrypted data to be sent by device 10 to a host system 75. Host system 75 typically will have available PIN data for the true owner of card 230 and can rapidly confirm whether the pinpad input PIN and the known valid PIN agree. This comparison outcome can be sent by host system 75 to device 10, whereupon an individual using device and module 210 to transact a sale rapidly learns whether the sale should proceed, e.g., there is PIN-agreement. If there is discrepancy between the known valid PIN and the pinpad manually input PIN, device 10 can so indicate audibly via transducer 100 and/or visually via display 60, and the transaction will be aborted.

As noted, device 10 can communicate with host 75 via a port 75, a modem, and telephone lines, for example. Alternatively, communication channels may be via infrared or wireless telephony, which further promotes portability. As a result, if card 230 is lost or stolen, an individual attempting to transact a purchase with module 200 in FIG. 3 will be unable to input a PIN on pinpad 240 that is confirmed by a remote host system communicating with device 10. Absent a confirmation, e.g., as shown on display 60 or sounded by transducer 100 in device 10 responsive to host input data, the transaction would not be allowed.

Figure 4:
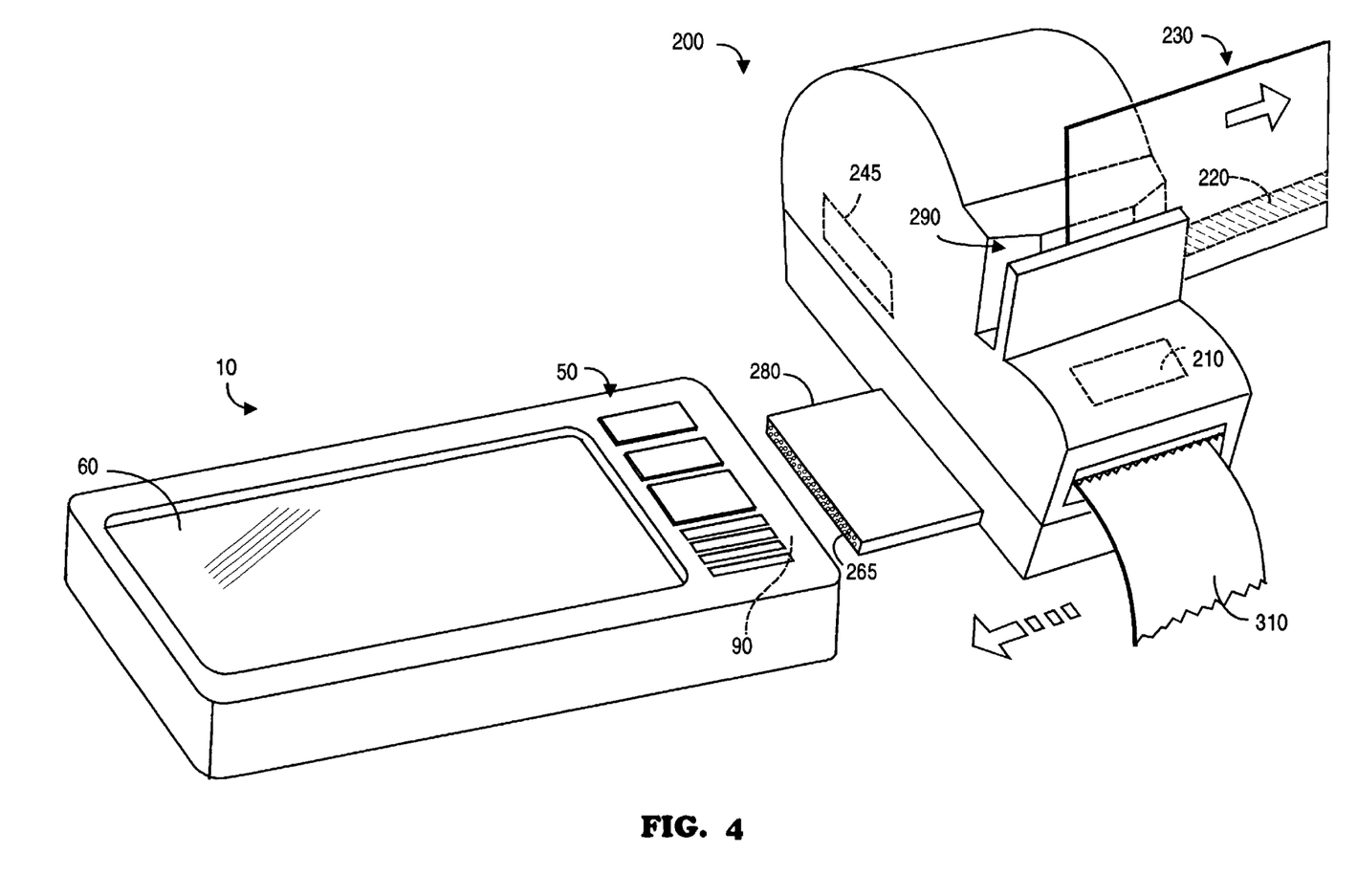
FIG. 4 is a perspective view of a third, printer unit equipped, embodiment used with a PDA to implement a PCMCIA-based point of sale transaction terminal system according to the present invention.

In a portable point of transaction system, it may be useful to have a real-time printout of a transaction. Accordingly, FIG. 4 depicts an embodiment in which module 200 includes both magnetic stripe reader 210 and printer unit 245. Again, element 245 is understood to include hardware and software necessary to implement the printer function. Unit 245 prints a hardcopy 310 with relevant data as the transaction completes.

Figure 5:
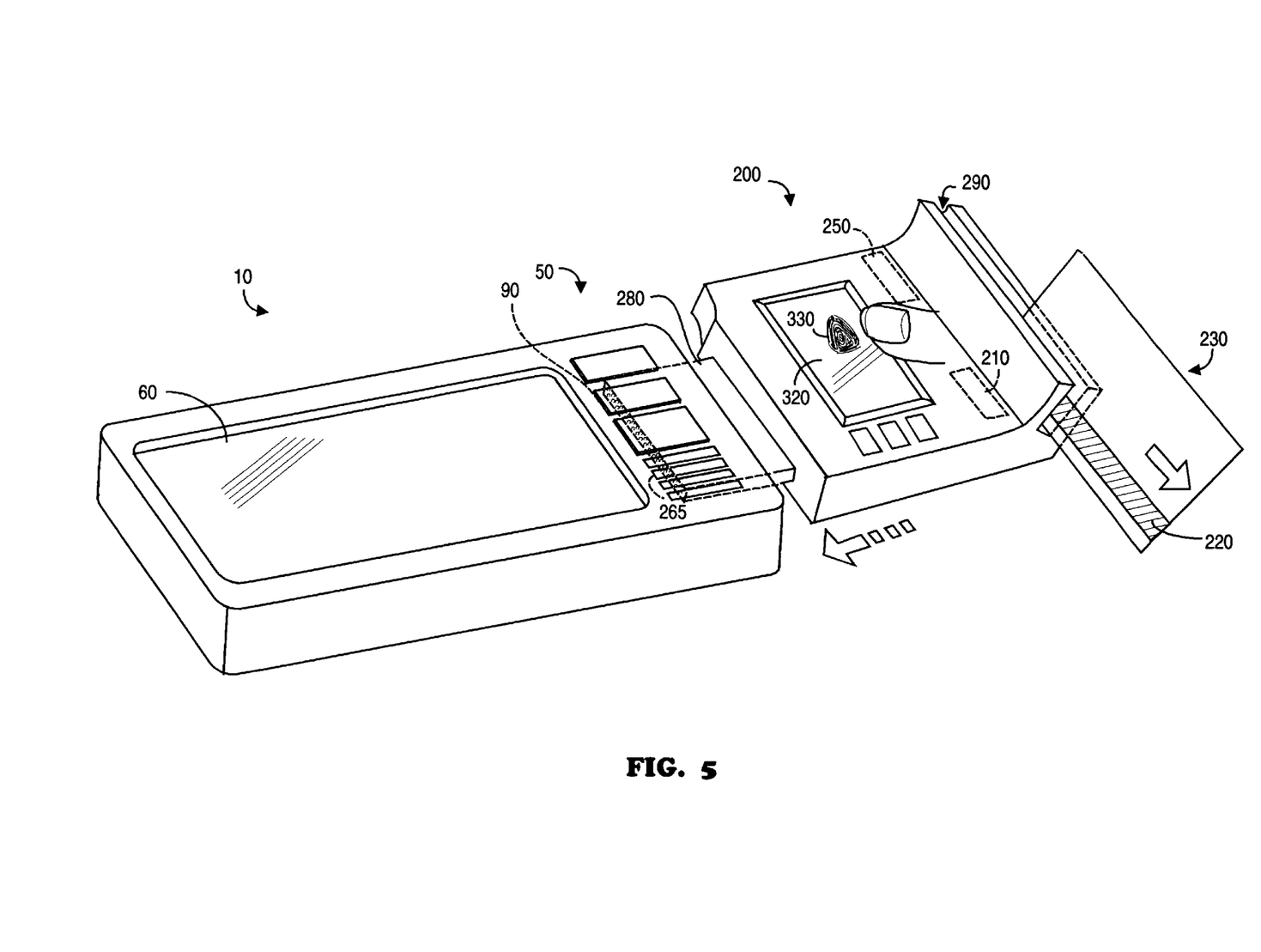
FIG. 5 is a perspective view of a fourth, fingerprint reader unit equipped, embodiment used with a PDA to implement a PCMCIA-based point of sale transaction terminal system according to the present invention.

FIG. 5 depicts an embodiment in which module 200 includes a fingerprint unit 250. As described in said pending patent application Ser. No. 08/853,955, a fingerprint can be used to generate secure PIN data. In FIG. 5, module 200 includes a fingerprint-sensitive screen 320 upon which a user during a transaction places a fingerprint 330. Such screens typically are charge sensitive, but may be implemented in other ways as well. Unit 250 with software 35 and/or 45 examines the pattern of a central portion of fingerprint 330, and by executing an algorithm determines a token or PIN value. This token PIN is substantially unique to fingerprint 330, and it is extremely unlikely that the pattern of a fingerprint of another user attempting to use card 230 would generate the same PIN token.

The token PIN can earlier have been stored in card 230 (magnetically in stripe 220 and/or in memory 225 if card 230 is a smartcard), for example when the card was issued. Further, remote host system 75 can also have been provided with the token PIN value at the time of card issuance. If the transaction-generated fingerprint token PIN value agrees with the known token PIN value (obtained from card 230 and/or remote host system 75), the transaction is allowed to proceed. It will be appreciated that among the advantages of a fingerprint token PIN value are the extremely secure and substantially non-duplicable nature of this PIN, and the fact that the card user no longer has to memorize a PIN value for use during a transaction. Further, it may be advantageous not to encrypt the token PIN value within card 230 or host system 75, due to the inability of a person other than the card owner to generate a fingerprint token PIN value with module 200 during a transaction.

Figure 6:
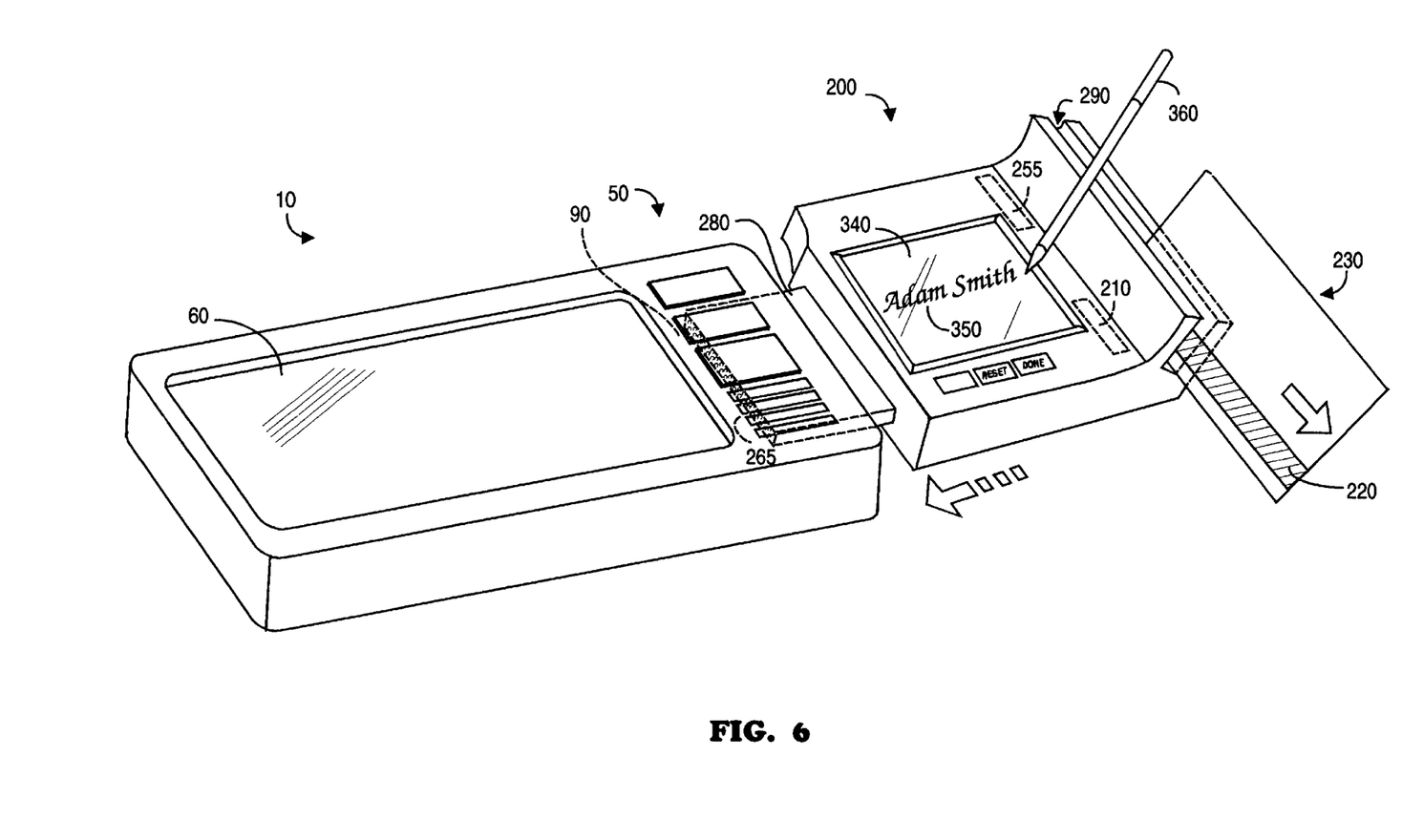
FIG. 6 is a perspective view of a fifth, signature capture unit equipped, embodiment used with a PDA to implement a PCMCIA-based point of sale transaction terminal system according to the present invention.

FIG. 6 depicts an embodiment in which module 200 further includes a signature capture unit 255. In this embodiment, unit 255 includes a pressure sensitive screen 340 upon which a signature or other writing 350 may be drawn with a stylus 360. In the embodiment shown, unit 255 includes a preferably LCD unit immediately beneath the pressure sensitive surface of screen 340. The result is that as the tip of stylus 360 is moved across the surface of screen 340, pixels in the writing 350 are displayed.

Electronics within unit 355 in conjunction with software 35 and/or 45 captures, signal processes, and preferably compresses signature 350. The compressed signature data may then be transmitted by unit 10 to remote host system 75, which stores a valid exemplar of the signature of the true owner of card 230. If the host system stored signature matches the module 200 written signature, the host system will return a signal, visible and/or audible, to device 10 whereupon the transaction will be allowed to complete.

Figure 7:
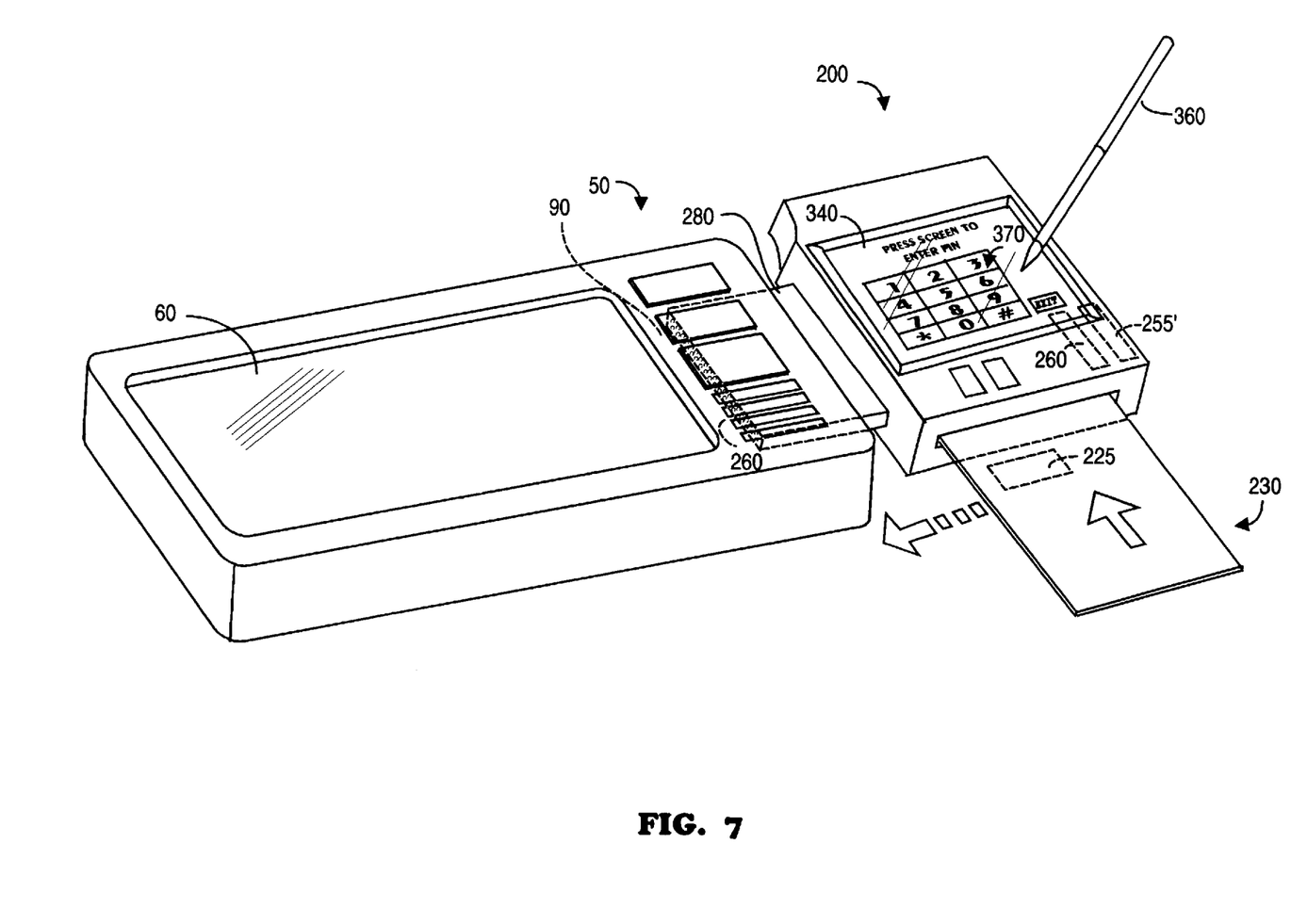
FIG. 7 is a perspective view of a sixth, smartcard reader/writer unit equipped and virtual pinpad unit equipped, embodiment used with a PDA to implement a PCMCIA-based point of sale transaction terminal system according to the present invention.

The embodiment of FIG. 7 provides module 200 with a smartcard reader/writer unit 255, as well as with a pressure sensitive screen 340. It is understood that unit 255 could of course be provided in any of the embodiments of FIGS. 2–6 in addition to or in lieu of magnetic card stripe reader unit 210. In FIG. 7, screen 340 and electronics 255' need not display screen pixels touched by the tip of stylus 360. In the embodiment shown, a virtual pinpad 370 is displayed on screen 340 and is responsive to pressure from the tip of the stylus. A user may manually enter a PIN by touching various of the keys displayed on screen 340 with the stylus tip or other object.

Memory 225 within smartcard 230 can store substantially more data than can one or even three magnetic stripes. An appropriate smartcard 230 may store user account number, present maximum dollar limit of the account, user identification as well as preferably encrypted PIN data. Generally when a user purchases a smartcard 230, memory 225 is programmed to store the dollar value of the card, e.g., the value of the card. In a preferred embodiment, smartcard reader/writer unit 260 can both read and write to memory 225. Thus, if prior to the present transaction memory 225 stored $1,000 as the present card balance and if the present transaction is a $200 debit, unit 260 can so debit memory 225 such that the new present card balance is $800.

As noted, according to the present invention, module 200 may include any or all combination(s) of magnetic stripe reader unit 210, smartcard reader/writer unit 260, pinpad unit 240, printer unit 245, fingerprint unit 250, and signature capture unit 255. It will be appreciated that the present invention may be marketed as modular kit, including an assembly of these modules, or modules including two or more of these units. The kit could also include appropriate software 35/45 storable in device 10 memory for execution by CPU 20.

Modifications and variations may be made to the disclosed embodiments without departing from the subject and spirit of the invention as defined by the following claims.

What is claimed is:

1. For use with a computer device that includes a central processor unit (CPU), memory, and a PCMCIA-complaint card slot connector, and for use with a card bearing magnetically stored information, a portable point of sale transaction module comprising:

a module housing including a projecting member having a PCMCIA-compliant connector sized to matingly engage said card slot connector in said computer device;

a virtual pinpad unit, disposed in said housing, including a screen upon which a pinpad image responsive to user contact-entry during said transaction is displayed; and a card reader able to read data stored on a card in a manner selected from a group consisting of (i) data stored magnetically on at least one magnetic stripe on said card, and (ii) data stored in a solid state memory contained within said card, said card reader disposed in said module housing;

wherein software storable in said memory and executed by said CPU processes data read from said card by said card reader during a transaction made with said card and processed pinpad data entered by said user on said virtual pinpad, including user-entered personal identification number data entered during said transaction.

2. The portable point of sale transaction module of claim 1, wherein said card reader is a magnetic stripe reader, and said card is a credit card.

3. The portable point of sale transaction module of claim 1, wherein said card reader includes a smartcard reader/writer, and said card is a smartcard.

4. The portable point of sale transaction module of claim 1, wherein said computer device is selected from a group consisting of (i) a personal digital assistant (PDA), and (ii) a laptop computer.

5. The portable point of sale transaction module of claim 1, wherein an owner of said card has a personal identification number (PIN) that must be correctly manually entered on said pinpad unit during said transaction to complete said transaction.

6. The portable point of sale transaction module of claim 1, wherein said module includes software and memory storing encryption keys to encrypt PIN data manually entered on said pinpad unit during said transaction, such that said PIN is not made available to said device except in encrypted form, to promote security.

7. The portable point of sale transaction module of claim 1, wherein an owner of said card has a personal identification number (PIN) stored as encrypted PIN data in a host system accessible to said module during said transaction;

wherein said module provides encrypted said PIN data entered from said pinpad unit during said transaction to said host system.

8. The portable point of sale transaction module of claim 1, further including a printer unit, disposed in said housing;

wherein software storable in said memory and executed by said CPU commands said printer to print data associated with a transaction made with said card.

9. The portable point of sale transaction module of claim 1, further including a signature capture unit, disposed in said housing, said signature capture unit including a screen upon which a signature is written by a user during said transaction;

wherein software storable in said memory and executed by said CPU captures and signal processes a signature written on said signature capture unit during said transaction; and wherein said device is able to receive, via a remote host system, digital data representing a valid signature of an owner of said card for purposes of determining genuineness of a captured said signature.

10. The portable point of sale transaction module of claim 9, wherein said screen included in said virtual pinpad unit is said screen upon which said signature is written by said user during said transaction.

11. The portable point of sale transaction module of claim 1, further including a fingerprint unit, disposed in said housing, said fingerprint unit including a screen upon which a fingerprint of a user is made during said transaction and including circuitry for generating electronic data representing said fingerprint;

wherein software storable in said memory and executed by said CPU reduces said electronic data to a token personal identification number value representing a portion of said fingerprint; and wherein said device is able to receive data representing a valid fingerprint token personal identification number value for an owner of said card via a remote host system for purposes of determining ownership of said card.

12. A method of providing a portable point of sale transaction terminal for use with a card storing information, comprising the following steps:

(a) providing a hand-holdable computer device that includes a central processor unit (CPU), memory, and a PCMCIA-complaint card slot connector;

(b) providing a portable point of sale module having a module housing that includes a PCMCIA-compliant connector sized to matingly engage said card slot connector in said computer device, said module including a touch-sensitive screen, attached to said module housing, upon which said computer device can display an image of a virtual pinpad responsive to contact from a user of said terminal during a transaction; and (c) disposing within said module housing at least one of (i) a magnetic stripe reader able to read data stored on a magnetic stripe on said card, a smartcard reader able to read data stored in memory internal to said card, (iii) a pinpad unit, (iv) a printer unit, (v) a signature capture unit, and (vi) a fingerprint unit; and (d) providing software storable in said memory that upon execution by said CPU will, at least, process data read from said card during a transaction made with said card, said memory including software executable by said CPU to process pinpad data entered by said user on said virtual pinpad during said transaction.

13. The method of claim 12, wherein said CPU executes software in said memory enabling said touch-sensitive screen to be further used to capture a signature made by said user during said transaction.

14. A portable point of sale transaction terminal, comprising:

a computer device that includes a central processor unit (CPU), memory, and a PCMCIA-complaint card slot connector;

a magnetic stripe reader able to read data magnetically stored on at least one magnetic stripe on a card used to transact a sale on said terminal;

a module housing in which said magnetic stripe reader is disposed, said module housing including a PCMCIA-compliant connector sized to matingly engage said card slot connector in said computer device;

a touch-sensitive screen, attached to said module housing, upon which said computer device can display an image of a virtual pinpad responsive to contact from a user of said terminal during a transaction; and software storable in said memory and executed by said CPU to process data read from said card by said magnetic stripe reader during a transaction made with said card and to process pinpad data entered by said user during said transaction upon said image of a virtual pinpad.

15. The portable point of sale transaction terminal of claim 14, wherein said computer device is selected from a group consisting of (i) a personal digital assistant (PDA), and (ii) a laptop computer.

16. The portable point of sale transaction module of claim 15, wherein during said transaction said user must correctly input PIN data using said pinpad unit;

wherein said pinpad unit includes software-memory encrypting said PIN data input using said pinpad unit; and during said transaction encrypted said PIN data is coupled to a remote host system that has stored correct PIN data associated with a true user of said card, said remote host system comparing said encrypted said PIN data with said stored correct PIN data for purposes of rendering said transaction secure.

17. The portable point of sale transaction terminal of claim 14, wherein said CPU further executes software of capture a signature made on said screen by said user during said transaction.

18. The portable point of sale transaction module of claim 14, wherein said memory stores encryption keys used to encrypt PIN data entered on said virtual pinpad; and said module further including a mechanism erasing said encryption keys from said memory if said module housing is tampered with.

19. The portable point of sale transaction terminal of claim 14, further including a printer unit, housed in said module housing;

wherein software loaded in said memory and executed by said central processor unit commands said printer to print data associated with a transaction made with said card using said point of sale transaction terminal.

20. The portable point of sale transaction module of claim 6, wherein said pinpad unit automatically erases each encryption key used to encode pinpad-entered PIN data if said module housing is tampered with.

* * * * *